United States Patent [19]

VanderPol et al.

[11] Patent Number: 5,083,484

[45] Date of Patent: Jan. 28, 1992

[54] PIPE END PREPARATION TOOL HAVING IMPROVED TORQUE REACTING AND CLAMPING CAPABILITIES

[75] Inventors: Jerald VanderPol, Eldorado Hills; Mark A. Marshall, Sacramento; Warren V. Wheeler, Placerville, all of Calif.

[73] Assignee: Tri Tool Inc., Rancho Cordova, Calif.

[21] Appl. No.: 548,663

[22] Filed: Jul. 5, 1990

[51] Int. Cl.$^5$ .................................. 82 168; 82 169; B23B 3/22
[52] U.S. Cl. ............................................. 82/113
[58] Field of Search ................. 82/113, 128, 168, 169

[56] References Cited

U.S. PATENT DOCUMENTS

| | | |
|---|---|---|
| 2,493,995 | 1/1950 | Nowka . |
| 3,067,651 | 12/1962 | Hogden et al. . |
| 3,229,555 | 1/1966 | Castles, Jr. . |
| 3,772,944 | 11/1973 | Becker et al. ............ 82/113 |
| 3,875,832 | 4/1975 | Mayfield . |
| 3,902,385 | 9/1975 | Haby . |
| 3,916,519 | 11/1975 | Gilmore . |
| 3,982,451 | 9/1976 | Gilmore ............ 82/113 |
| 4,050,836 | 9/1977 | Anders . |
| 4,126,065 | 11/1978 | Clavin . |
| 4,149,436 | 4/1979 | Blattler ............ 82/113 |
| 4,169,396 | 10/1979 | Astle . |
| 4,245,529 | 1/1981 | Astle . |
| 4,246,814 | 1/1981 | Pertle . |
| 4,257,289 | 3/1981 | Groothius . |
| 4,411,178 | 10/1983 | Wachs et al. ............ 82/113 |
| 4,434,689 | 3/1984 | Nall et al. . |
| 4,437,366 | 3/1984 | Astle . |
| 4,470,734 | 9/1984 | Miller . |
| 4,483,522 | 11/1984 | Nall et al. . |
| 4,493,232 | 1/1985 | Nall . |
| 4,677,884 | 7/1987 | Kwecht et al. ............ 82/113 |
| 4,776,248 | 10/1988 | Birkestrand . |
| 4,784,028 | 11/1988 | Sandford ............ 82/128 |
| 4,824,301 | 4/1989 | Martin . |
| 4,829,860 | 5/1989 | VanderPol . |
| 4,852,435 | 8/1989 | Hunt . |

Primary Examiner—Bruce M. Kisliuk
Assistant Examiner—Lawrence Cruz
Attorney, Agent, or Firm—Bacon & Thomas

[57] ABSTRACT

The present invention relates to a clamping device for clamping a mandrel to an elbow or pipe as well as to a torque-reacting device between a power unit housing and the mandrel. The torque reacting device has a pair of torque reacting keys mounted in a non-rotatable portion of the power unit housing, each of the keys having an end portion with converging opposite sides. The end portions of the torque reacting keys extend into correspondingly shaped, axially extending grooves formed in opposite sides of the mandrel. The opposite sides of the grooves are outwardly diverging and define an included angle approximately equal to the angle between the converging sides of the torque reacting keys. Adjusting screws are provided for each of the torque reacting keys. The clamping device has a plurality of clamping pins, each pin having a generally cylindrical shape with a hemispherical end portion defining a plurality of concentric ridges. An axially moveable actuating member bears on an a second end of the centering pins such that movement of the member along the longitudinal axis of the mandrel urges each of the centering pins into contact with the pipe surface.

9 Claims, 7 Drawing Sheets

PIPE END PREPARATION TOOL HAVING IMPROVED TORQUE REACTING AND CLAMPING CAPABILITIES

This application is a division of application Ser. No. 373,517, filed June 30, 1989.

BACKGROUND OF THE INVENTION

The present invention relates to a pipe end preparation tool having improved torque reacting and clamping capabilities in order to minimize the time necessary to machine pipe ends.

Portable lathes for machining the ends of pipes are well known in the art and typically comprise a mandrel, a device to clamp the mandrel to the pipe such that it is aligned with the center line of the pipe and a power unit mounted on the mandrel. The power unit has a rotatable portion, to which one or more machining tools are attached, and a non-rotatable portion slidably attached to the mandrel. Means are provided on the power unit to move it axially along the mandrel in order to feed the machining tools into the end of the pipe.

The power unit also comprises a drive mechanism, attachable to an external power source, to rotate the rotatable portion to which the machining tool is attached. Typically, a pneumatically or hydraulically driven motor is attached to the power unit such that its output shaft is drivingly connected to the rotatable portion. The drive may include inter-engaging bevel gears, one such bevel gear attached to an input shaft, while the meshing bevel gear is affixed to the rotating portion of the power unit.

Clamping means are provided on one end of the mandrel to clamp it to the pipe. Such clamping means may be either external, to clamp the mandrel to the exterior of the pipe, or internal, wherein a portion of the mandrel extends into and is clamped to the interior of the pipe. The internal clamping devices typically comprise a plurality of clamping members mounted on the mandrel so as to move in a radial direction with respect to the longitudinal axis of the mandrel. The clamping members are radially expanded or contracted by axial movement between wedge surfaces formed on a portion of the mandrel and each of the clamping members. Such clamping members are usually formed as narrow, elongated members having a significant length in the direction of the longitudinal axis of the mandrel.

In order to minimize the time for machining the end of an elbow or a pipe, it is necessary to take as large a cut per revolution of the machining tool as possible. The torque necessary to maximize the cut must be reacted by the interconnection between the non-rotatable portion of the power unit and the mandrel, as well as through the device clamping the mandrel to the elbow or pipe. Torque reacting devices are known which are designed to be interposed between the mandrel and the power unit housing to increase their torque reacting capabilities. However, such devices are subject to shear forces and wear which require them to be replaced, since they are not adjustable to accommodate for such wear.

Elongated clamping members do not provide satisfactory results even when the mandrel is attached to an elongated pipe section in which there is sufficient room within the interior of the pipe to accommodate the length of the clamping members. The relatively narrow dimension of the known clamping members does not provide the necessary clamping force to react the torque generated during maximum cut machining operations.

Problems also arise when the mandrel must be attached to a pipe elbow or the like, since there is usually not room within the interior to accommodate the length of the elongated clamping members. Such known clamping devices have failed to provide the necessary rigid support to the mandrel to accurately machine the ends of the elbow.

SUMMARY OF THE INVENTION

The present invention relates to a clamping device for clamping a mandrel to an elbow or pipe, as well as a torque-reacting device interposed between the power unit housing and the mandrel in order to allow the cutting tool to take the maximum possible cut. The torque reacting device has a pair of torque reacting keys mounted in the non-rotatable portion of the power unit housing, each of the keys having an end portion with converging opposite sides. The end portions of the torque reacting keys extend into correspondingly shaped, axially extending grooves formed in opposite sides of the mandrel. The opposite sides of the grooves are outwardly diverging and define an included angle approximately equal to the angle between the converging sides of the torque reacting keys. Adjusting screws are provided for each of the torque reacting keys and are located such that rotation of the screws move the torque reacting keys relative to the grooves in order to accommodate for wear between the keys and the grooves.

A clamping device is provided on the end of the mandrel to clamp it to a pipe. Where the portable lathe is to be attached to a pipe elbow or the like, the clamping device has a plurality of clamping pins, each pin having a generally cylindrical shape with a hemispherical end portion defining a plurality of concentric ridges. An axially moveable actuating member bears on a second end of the clamping pins such that movement of the member along the longitudinal axis of the mandrel urges each of the clamping pins into contact with the pipe surface. The ridges in contact with the pipe elbow surface increase the clamping rigidity of the mandrel, while at the same time minimizing the axial length of the clamping elements.

A clamping device having elongated clamping members may be used to clamp the mandrel to a straight length of pipe. The clamping members have increased width and bear on spaced apart grooves formed on the clamping head to increase their torque reacting capabilities.

DETAILED DESCRIPTION OF THE PREFERRED EMBODIMENTS

Figure 1:
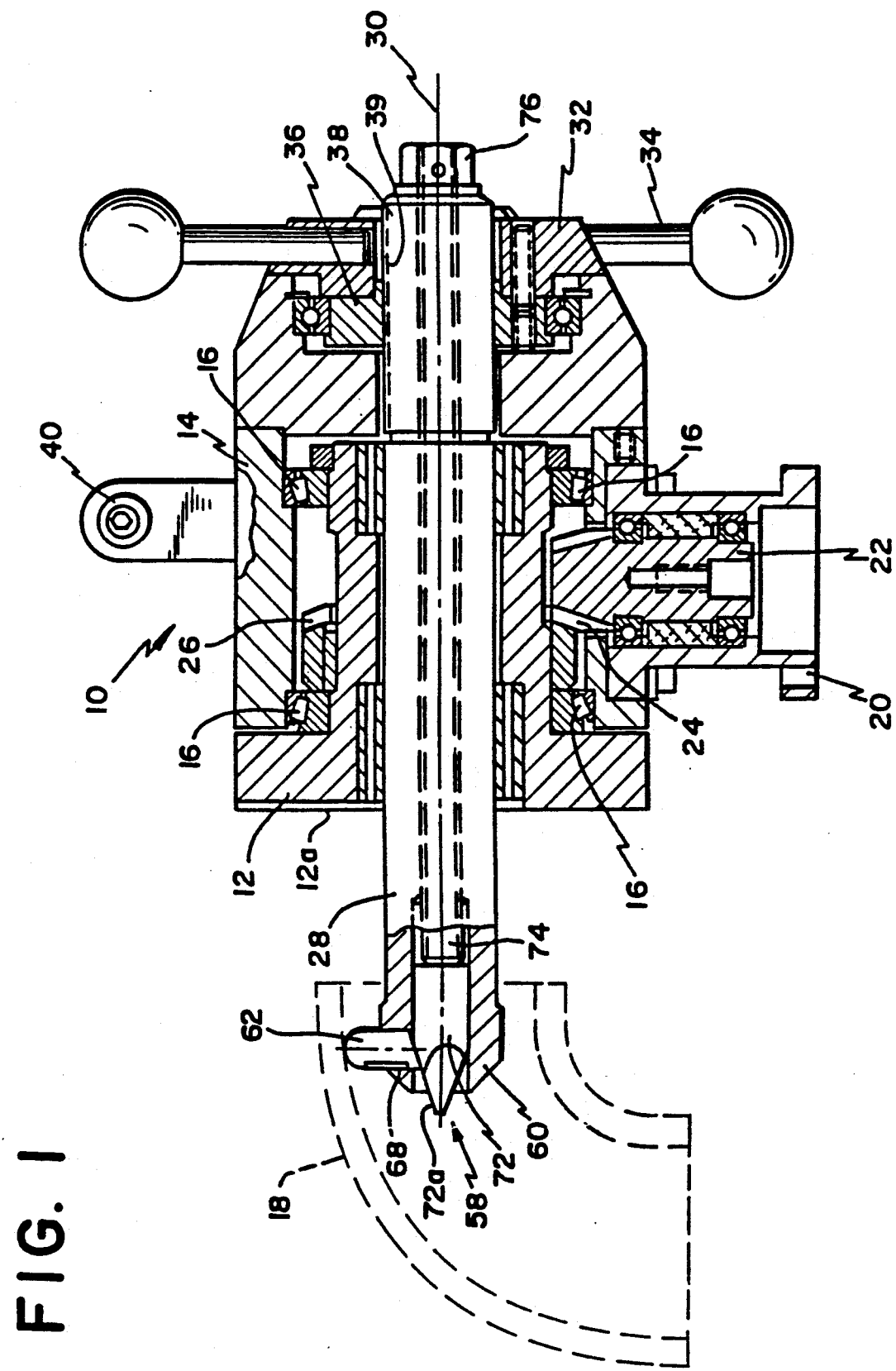
FIG. 1 is a side view, partially in section, of a portable lathe according to the invention.

The portable lathe according to the invention, as illustrated in FIG. 1, comprises a power unit 10 having a rotatable portion 12 and a non-rotatable portion 14. Rotatable portion 12 is rotatably supported within portion 14 by bearings 16. One or more cutting tools (not shown) may be mounted on the face 12a in order to perform various machining operations on the end of a pipe elbow 18, or the like, as is well known in the art. Although the invention will be described in terms of its association with a pipe elbow, it is to be understood that the device may be equally applicable to machining the ends of straight lengths of pipes and end flanges.

A power source (not shown) is attached to flange 20 such that the output shaft of the power source drives input shaft 22 and bevel gear 24. Bevel gear 24 meshes with a corresponding bevel gear 26 fixedly attached to the rotating portion 12.

The non-rotatable power unit housing portion 14 is slidably mounted on mandrel 28. The power unit 10 is moveable along the mandrel 28 in directions generally parallel to the longitudinal axis 30 of the mandrel by rotating feed ring 32 having handles 34 and being attached to threaded feed member 36. Feed member 36 is threadingly engaged with feed threads 39 formed on the exterior surface of a portion of the mandrel 28. Thus, as is well known in the art, rotation of the handles 34 causes the power unit 10 to move toward or away from the end of pipe elbow 18 in order to bring the cutting tools (not shown) into, or move them out of contact with the pipe end. A handle 40 may be attached to the non-rotating portion 14 to facilitate the manipulation of the tool, if desired.

Figure 2:
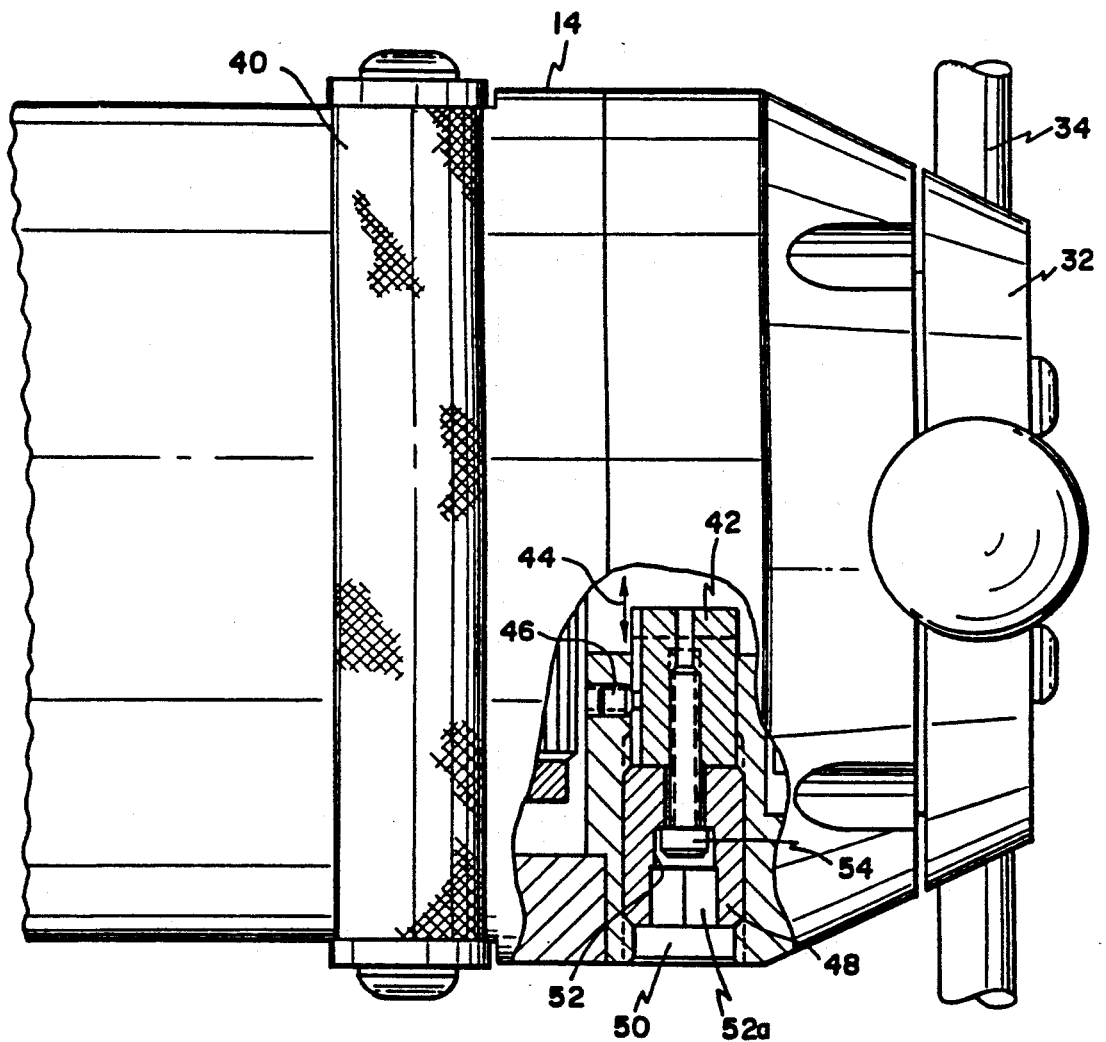
FIG. 2 is a partial top view of the power unit shown in FIG. 1, partially broken away, illustrating the torque reacting key according to the invention.
Figure 4:
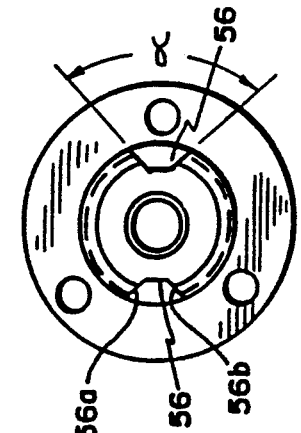
FIG. 4 is an end view of the mandrel illustrated in FIG. 3.

The means for reacting the torque between the power unit portion 14 and the mandrel 28 is best illustrated in FIGS. 2–4 and 10–12. FIG. 2 is a view showing one of the torque reacting keys 42 slidably mounted in a bore defined by power unit portion 14 so as to be non-rotatably slidable in the directions indicated by arrows 44, a direction generally perpendicular to the longitudinal axis 30 of mandrel 28. Torque reacting key 42 may have a slot defined along one side which is engaged by a portion of set screw 46 to allow the key to move in the direction of arrows 44, but prevent rotation thereof.

An end portion of the torque reacting key 42 extends into the opening extending through the power unit 10 to accommodate mandrel 28. The end portion has converging opposite sides 42a and 42b defining an included angle $\alpha$.

Adjusting screw 48 threadingly engages bore 50 defined by the non-rotatable power unit portion 14 such that an end thereof bears against one end of the torque reacting key 42. Adjusting screw 48 defines an opening 52 therethrough to accommodate locking bolt 54 and to define a polygonal opening portion 52a. As can be seen, the rotation of adjusting screw 48 will exert a force on torque adjusting key 42 to move it in the direction of arrows 44. Locking bolt 54, which passes through adjusting screw 48 and is threadingly engaged with torque reaction key 42 locks these elements in their adjusted positions by tightening the torque reacting key 42 against adjusting screw 48.

Figure 12:
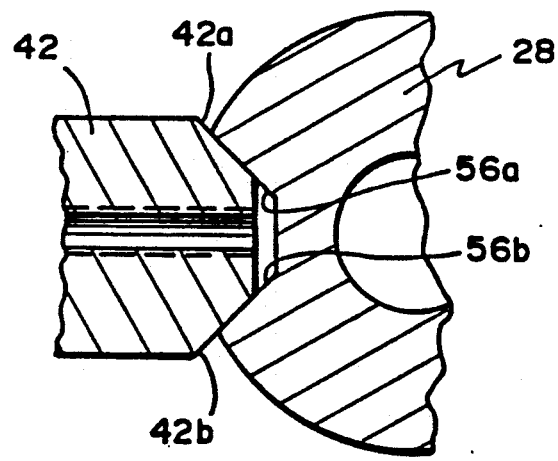
FIG. 12 is a partial, cross-sectional view illustrating the engagement of a torque reacting key and a groove.
Figure 15:
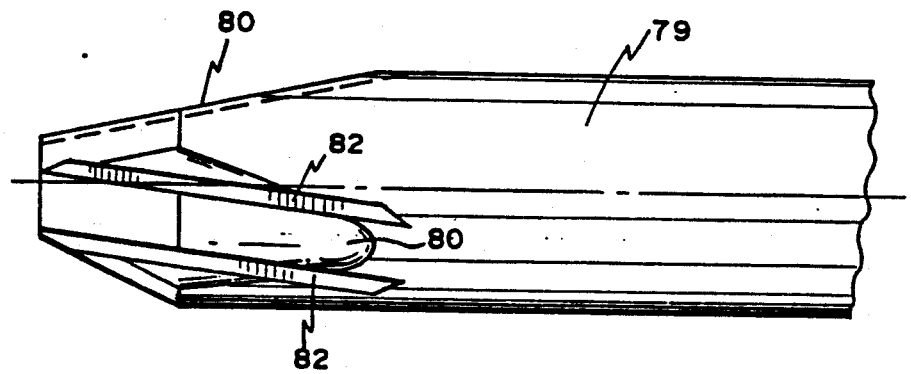
FIG. 15 is a partial side view of the clamping end of the mandrel shown in FIG. 13.
Figure 17:
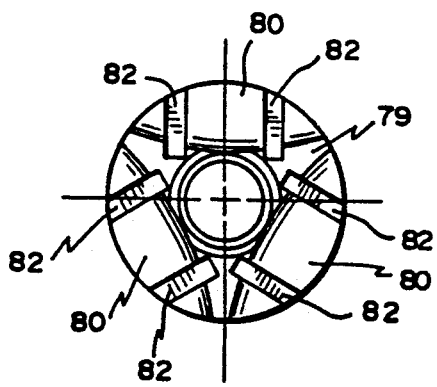
FIG. 17 is an end view of the mandrel shown in FIG. 15.
Figure 16:
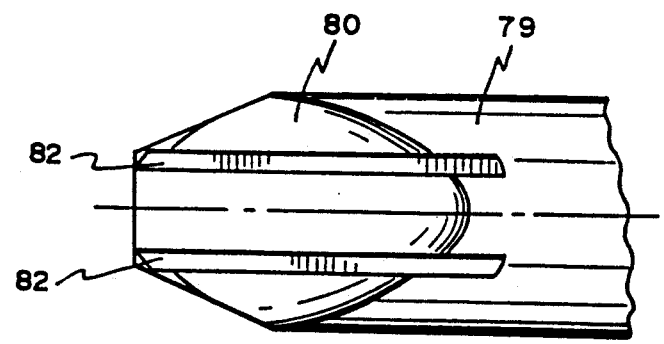
FIG. 16 is a partial top view of the end of the mandrel shown in FIG. 15.
Figure 18:
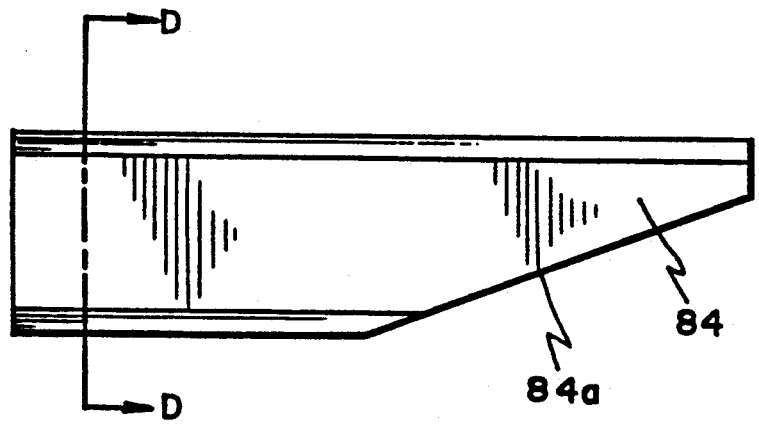
FIG. 18 is a side view of the clamping member of FIG. 14.
Figure 19:
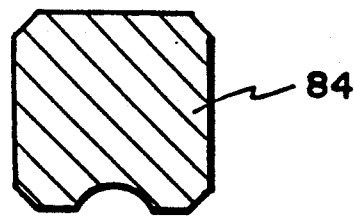
FIG. 19 s a cross-sectional view taken along line D—D in FIG. 18.

An end portion of mandrel 28 defines generally longitudinally extending grooves 56 on diametrically opposite sides thereof. The grooves 56 have outwardly diverging sides 56a and 56b defining an included angle $\alpha$, which is substantially equal to the included angle $\alpha$ defined between the converging opposite sides 42a and 42b of the torque reacting key 42. As seen in FIG. 12, the positions of the torque reacting keys 42 are adjusted so that the end portions enter grooves 56 such that surface 42a contacts surface 56a and surface 42b contacts surface 56b. The surfaces may be in sliding contact with each other to permit the power unit 10 to move axially along the mandrel 28, while at the same time, the interengagement of the contact surfaces will react the torque imposed upon the power unit by the action of the cutting tool on the pipe end.

The angled contact surfaces 42a, 42b, 56a and 56b allow the position of the torque reacting key 42 to be adjusted relative to the mandrel 28 to accommodate for any wear of these surfaces. By merely positioning the torque reacting key further inwardly toward the mandrel axis 30, any wear of these surfaces may be taken up and the surfaces brought back into contact with each other. This is not possible with the known torque reacting devices which utilize a rectangular cross sectional slot into which is inserted a correspondingly shaped torque reacting key. Once the generally parallel side surfaces of either the key or the groove become worn, it is impossible to adjust the key to compensate for the worn surfaces. It is envisioned that the angle $\alpha$ will be approximately equal to 90°, although this value may vary depending upon the precise application of the power unit and cutting tool.

The angled contact surfaces also reduce the shear forces imposed on the torque reacting keys and the mandrel. The forces will extend perpendicular to the contact surfaces and, hence, only a portion thereof will be directed at a right angle to the central axis of the torque reacting key to reduce the shear loads.

The other end of the mandrel 28 accommodates a clamping mechanism, generally indicated at 58. As best seen in FIG. 1, the clamping mechanism to clamp the mandrel to a pipe elbow 18 or the like comprises a clamping head 60 having a plurality of clamping pins 62 slidably, but non-rotatably, mounted therein. Although the clamping head is illustrated as having three such clamping pins, quite obviously other numbers of pins may be utilized without exceeding the scope of this invention.

Figure 5:
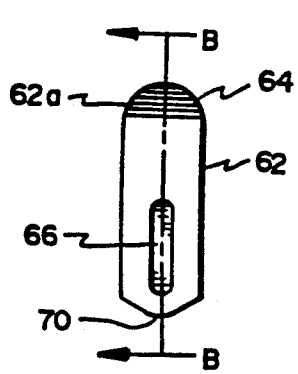
FIG. 5 is a front view of a clamping pin according to the invention.
Figure 6:
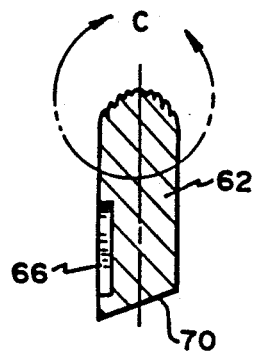
FIG. 6 is a cross sectional view taken along line B—B in FIG. 5.
Figure 7:
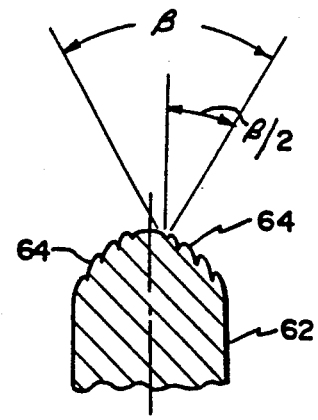
FIG. 7 is an enlarged view of portion C of the clamping pin illustrated in FIG. 6.
Figure 13:
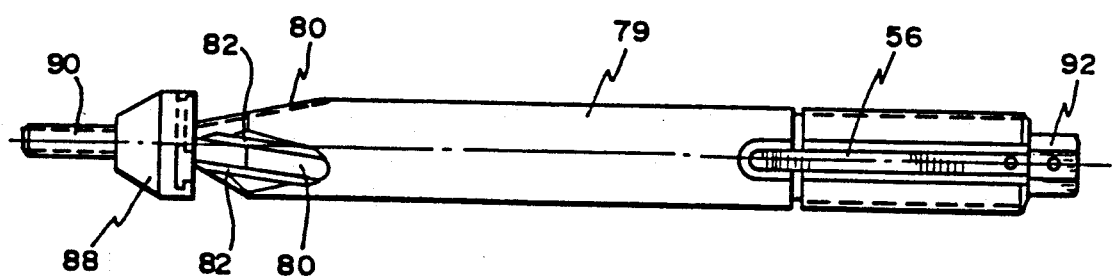
FIG. 13 is a side view of an alternative embodiment of the mandrel according to the invention.

A typical clamping pin is shown in detail in FIGS. 5-7. The clamping pin 62 has a generally cylindrical body portion with a generally hemispherical first end portion 62a defining a plurality of concentric ridges 64 thereon. The ridges 64 extend concentrically about the central axis of the general cylindrical body portion and form a clamping surface on the end of clamping pin 62 which has been discovered to markedly increase the clamping force of the device. Each of the concentric ridges has angled sides such that adjacent sides of adjacent ridges define an included angle $\beta$ which may be between 50° and 70° and is preferably on the order of 60°.

The clamping pin 62 also defines a generally longitudinally extending slot 66 into which is inserted a portion of set screw 68 on the clamping head 60 in order to prevent rotation of the clamping pin therein. Clamping pin 62 also defines an actuating surface 70 on a second end, which extends into the interior of the clamping head 60. Actuating surface 70 is a generally planar surface extending at an angle to the horizontal and is adapted to be contacted by a correspondingly angled surface 72a formed on actuating member 72. Actuating member 72 is slidably mounted in a central opening of mandrel 28 and is contacted by threaded feed screw 74. Feed screw 74 extends through and is threadingly engaged, with mandrel 28. Rotation of nut 76, which is fixed onto feed screw 74, will cause rotation of feed screw 74, such rotation causing axial movement of the feed screw 74 relative to the mandrel 28 due to their threaded interconnection. Axial movement of feed screw 74 causes axial movement of actuating member 72 which, in turn, causes generally radial movement of the contact pins 62 through the interaction of surfaces 72a with surfaces 70. As seen in FIG. 1, as the clamping pins 62 are urged outwardly, the ridges 64 will contact the interior of pipe elbow 18 thereby clamping the mandrel to the elbow.

The increased clamping force generated by the ridges 64 on the clamping pins 62 is of great importance in machining the ends of pipe elbows or other fittings wherein the curved nature of the fitting prevents any deep clamping penetration by the mandrel. The curvature of these elements prevents the use of elongated clamping members of the prior art. Attempts at shortening the axial length of the known clamping members has proven unsatisfactory insofar as they are then unable to generate a clamping force sufficient to accommodate the weight and torque imposed upon the mandrel by the power unit and the action of the cutting tool on the end of the fitting. The use of clamping pins according to the invention not only enables the mandrel to be clamped to the pipe elbow closely adjacent to the end thereof, but they provide a rigid and stable mounting for the power unit to consequently increase the accuracy of the machining.

Figure 8:
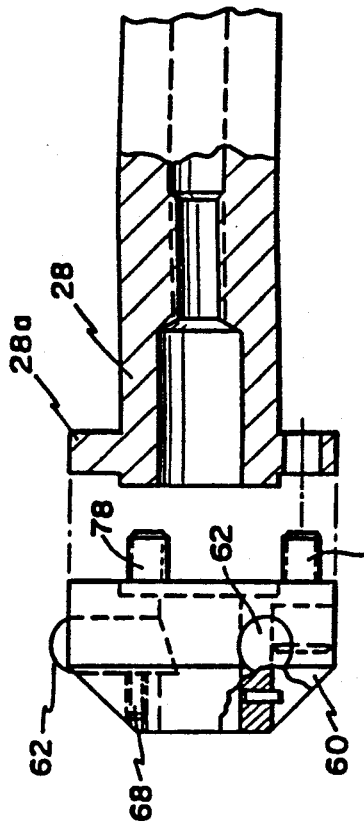
FIG. 8 is a partial, exploded side view, partially broken away, illustrating an alternative embodiment of the clamping head according to the invention.
Figure 9:
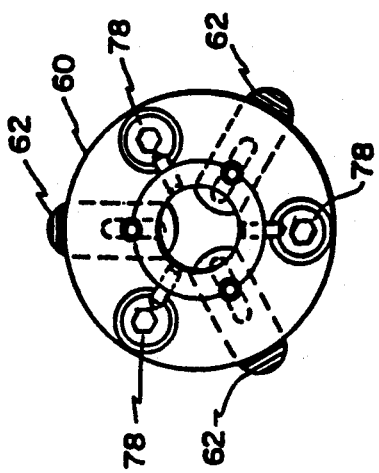
FIG. 9 is a front view of the clamping head illustrated in FIG. 8.
Figure 3:
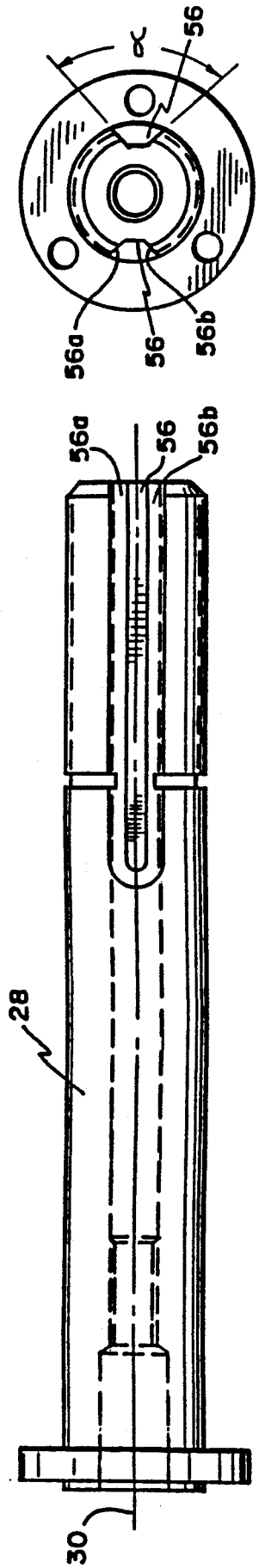
FIG. 3 is a side view of a mandrel according to the invention illustrating a torque reacting groove.

An alternative embodiment of the mandrel and clamping head is shown in FIGS. 8 and 9 wherein the clamping head 60 is removably attached to the mandrel 28. In this embodiment, the clamping head 60 is formed as a separate element and is attached to flange 28a, formed on the mandrel 28, by bolts 78 or the like. The clamping pins 62 and their actuation via actuating member 72 are exactly the same as in the previously described embodiment. The use of different sized clamping heads allows a common mandrel to be attached to various sizes of pipes. Also, different lengths of the clamping pins may be accommodated by a given clamping head to increase the range of pipe sizes to which the mandrel may be attached.

Figure 14:
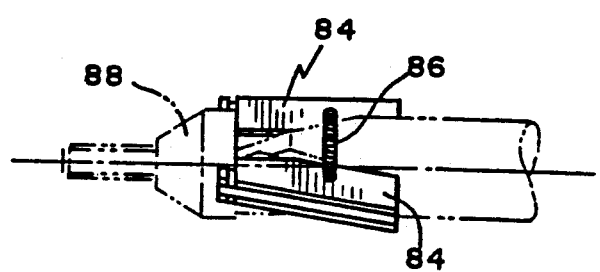
FIG. 14 is a partial view of the mandrel of FIG. 13 with clamping members according to the invention.
Figure 10:
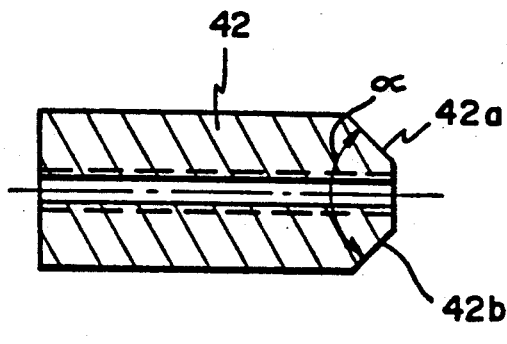
FIG. 10 is a cross-sectional view of a torque reacting key according to the invention.
Figure 11:
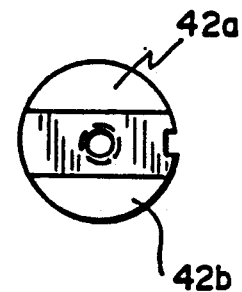
FIG. 11 is an end view of the torque reacting key shown in FIG. 10.

The invention also includes an improved clamping device for use on straight pipe sections to increase the clamping force and rigidity of the mandrel attachment. As illustrated in FIGS. 13-19, mandrel 79 defines grooves 56 on a portion thereof for interaction with the torque reacting keys of the power unit as in the previously described embodiments. The clamping end of mandrel 79 defines a plurality of beveled surfaces 80, three of which are shown on the disclosed embodiment. However, it should be understood that different numbers of beveled surfaces may be utilized without exceeding the scope of this invention. Each beveled surface 80 has a pair of generally parallel clamping notches 82 formed thereon to slidably accommodate portions of clamping members 84. A clamping member 84 is shown in detail in FIGS. 18 and 19 and has a pair of laterally displaced bearing surfaces 84a spaced so as to slidably engage the notches 82. The width of the clamping member 84 along with the lateral spacing of the surfaces 84a and the notches 82 provide an increased clamping force to react the torque generated during the cutting operation. As seen in FIG. 14, the clamping members 84 are mounted on bevel surfaces 80 such that the surfaces 84a slidably contact notches 82. A spring 86 extending circumferentially around mandrel 78 and through the clamping members 84 holds the clamping members on the mandrel 78 and urges them toward the center of the mandrel.

The forward ends of the clamping members 84 engage actuating ring 88 that is threadingly engaged with clamping screw 90. Clamping screw 90 extends through a longitudinal opening in mandrel 78 and may be rotated by nut 92 fixed on its opposite end. As can be seen, rotation of nut 92 and feed screw 90 will cause actuating ring 88 to move axially with respect to the mandrel 78, thereby urging the clamping members 84 along bevel surfaces 80. This also causes the clamping members 84 to expand radially outwardly to engage the inner surface of the pipe into which the mandrel is inserted.

The foregoing description is provided for illustrative purposes only and should not be construed as in any way limiting this invention, the scope of which is defined solely by the appended claims.

What is claimed is:

1. A clamping device for attaching a mandrel having a longitudinal axis to pipe comprising:
    (a) a clamping head associated with the mandrel;
    (b) a plurality of clamping pins slidably mounted in the clamping head so as to move in a direction substantially perpendicular to the longitudinal axis of the mandrel, each of the clamping pins having a central axis, a first end having a hemispherical shape and a plurality of circular ridges extending concentrically about the central axis on the first end of the clamping pin to form a clamping surface which increases the clamping effect of the pins; and,
    (c) means to move the clamping pins relative to the clamping head to urge the clamping surface on the first ends of the pins into contact with the pipes.

2. The clamping device according to claim 1, wherein the means to move the clamping pins comprises:

(a) an actuating surface on a second end of each of the clamping pins; and,
(b) an actuating member mounted on the mandrel so as to move in a direction generally parallel to the longitudinal axis of the mandrel and to contact the actuating surfaces of the clamping pins such that axial movement of the clamping pins.

3. The clamping device according to claim 1 further comprising attaching means to removably attach the clamping head to the mandrel.

4. A clamping pin for use in a device for clamping a mandrel to a pipe comprising:
(a) a generally cylindrical body portion having first and second end portions, and a central axis, the first end portion having a hemispherical shape;
(b) a plurality of circular ridges extending concentrically about the central axis on the first end portion to form a clamping surface; and,
(c) an actuating surface defined by the second end portion.

5. The clamping pin according to claim 4 wherein each ridge has sides such that the included angle between adjacent sides of adjacent ridges is between 50° and 70°.

6. The clamping pin according to claim 5 wherein the included angle between adjacent sides of adjacent ridges is approximately 60°.

7. The clamping device according to claim 2 wherein the clamping pin further comprises a generally cylindrical body portion between the first and second ends.

8. The clamping device according to claim 1 wherein each ridge has sides such that the included angle between adjacent sides of adjacent ridges is between 50° and 70°.

9. The clamping device according to claim 8 wherein the included angle between adjacent sides of adjacent ridges is approximately 60°.

* * * * *